(12) United States Patent
Fujii

(10) Patent No.: US 6,738,197 B2
(45) Date of Patent: May 18, 2004

(54) AUTOFOCUSING APPARATUS

(75) Inventor: Shinichi Fujii, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/304,487

(22) Filed: Nov. 26, 2002

(65) Prior Publication Data
US 2003/0099044 A1 May 29, 2003

(30) Foreign Application Priority Data

Nov. 29, 2001 (JP) .................................. P2001-364754

(51) Int. Cl.[7] .............................. G02B 15/14; G03B 3/00
(52) U.S. Cl. ...................... 359/698; 396/127; 396/125; 396/101
(58) Field of Search ........................... 359/698; 396/96, 396/101, 106–120, 125, 127; 348/208.12, 345–350, 353

(56) References Cited

U.S. PATENT DOCUMENTS 5,072,250 A * 12/1991 Makino ....................... 396/101
5,151,732 A * 9/1992 Akashi et al. ................. 396/96
5,225,940 A    7/1993 Ishii et al. ................... 359/823
5,572,282 A * 11/1996 Uchiyama .................... 396/125

FOREIGN PATENT DOCUMENTS

JP          05-236329 A      9/1993

* cited by examiner

Primary Examiner—Scott J. Sugarman
Assistant Examiner—M. Hasan
(74) Attorney, Agent, or Firm—Sidley Austin Brown & Wood LLP

(57) ABSTRACT

An autofocusing apparatus and method which prevents erroneously detecting a focus position due to a contrast pseudo peak. The system extracts an image component from an image signal and computes a contrast value. On the basis of the number of edges and the edge width center of gravity value the system determines whether the focusing lens is positioned close to the focus position or not. Even if the contrast value peaks, if the focusing lens is not close to the focus position, the lens position is not employed as a focus position.

9 Claims, 12 Drawing Sheets

AUTOFOCUSING APPARATUS

This application is based on application No. 2001-364754 filed in Japan, the contents of which are hereby incorporated by reference.

BACKGROUND OF THE INVENTION

1. Field of the Invention

The present invention relates to an autofocusing apparatus for receiving an image signal and performing an imaging lens focusing control.

2. Description of the Background Art

Generally, an autofocusing control in a digital camera uses a method of detecting the contrast of an image from an image signal obtained by taking a picture of a subject and driving an imaging lens to a lens position in which the contrast value shows its peak, thereby bringing the image into focus.

This method is based on the principle such that the contrast of an image is low when an image of a main subject is blurred, the contrast gradually increases as the image of the main subject is coming into focus, and the contrast becomes the maximum when the focus is completely achieved on the image. Consequently, in the autofocusing control, a control mode is employed such that the contrast is detected in each lens position while driving the imaging lens at a predetermined pitch, the lens position in which the contrast is at its peak is specified as a focus position of the imaging lens, and the imaging lens (more strictly, a focusing lens) is moved to the focus position.

At the time of capturing an image by using a digital camera, however, if there is a camera movement, subject movement or the like, another subject may be instantaneously included in an image at a certain lens position. In such a case, the contrast falsely shows its peak in the lens position.

Therefore, even if the lens position where the contrast shows its peak is detected by a conventional autofocusing control, there is the possibility that the peak is a pseudo peak due to camera movement or the like and is not a peak at which the main subject is actually in focus. It causes a problem such that the main subject cannot be properly brought into focus.

Particularly, the magnification of zooming is becoming higher in an imaging lens of a digital camera in recent years, so that the problem is becoming bigger.

SUMMARY OF THE INVENTION

The present invention is directed to an autofocusing apparatus applied to a digital camera or the like.

According to the present invention, this autofocusing apparatus includes: an image generator for generating an image signal constructed by a plurality of pixels; a first detector for detecting a contrast value of an image from the image signal generated by the image generator; a second detector for detecting the number of edges of an image from the image signal generated by the image generator; and a controller for performing a focusing control of an imaging lens on the basis of the contrast value and the number of edges detected by the first and second detectors.

Therefore, the apparatus is constructed to detect a contrast value of an image from an image signal, detect the number of edges of the image from the image signal, and perform a control of focusing an imaging lens on the basis of the contrast value and the number of edges. Thus, an influence of a pseudo peak can be eliminated and focus can be appropriately achieved on a subject.

According to one aspect of the autofocusing apparatus, when the number of edges detected by the second detector is equal to or larger than a predetermined value, the controller determines that the imaging lens is positioned close to a focus position and, when it is determined that the imaging lens is positioned close to the focus position, the controller drives the imaging lens to a lens position in which the contrast value detected by the first detector indicates its maximum value.

Consequently, a peak which is not a pseudo peak of the contrast value can be detected. By driving the imaging lens to the lens position in which the peak is indicated, focus can be appropriately achieved on the subject.

According to another aspect of the autofocusing apparatus, the autofocusing apparatus further includes a calculator for calculating an edge width center of gravity value of an image from the image signal generated by the image generator, and when the number of edges detected by the second detector is equal to or larger than a predetermined value and the edge width center of gravity value calculated by the calculator is within a predetermined range, the controller determines that the imaging lens is positioned close to the focus position.

Consequently, a peak which is not a pseudo peak of the contrast value can be detected more accurately while being little affected by noise.

According to still another aspect of the autofocusing apparatus, when it is determined that the imaging lens is positioned close to the focus position, the controller drives the imaging lens in the direction that the contrast value detected by the first detector increases.

Consequently, the imaging lens can be driven to the direction in which the focus position can be specified efficiently, so that efficient focusing control can be realized.

According to yet another aspect of the autofocusing apparatus, when it is not determined that the imaging lens is positioned close to the focus position, the controller drives the imaging lens at higher speed as compared with the case where it is determined that the imaging lens is positioned close to the focus position.

Therefore, the imaging lens can be efficiently moved close to the focus position, and the focusing control can be carried out at higher speed.

According to yet another aspect of the autofocusing apparatus, when it is determined that the imaging lens is positioned close to the focus position, the controller drives the imaging lens on the basis of only the contrast value detected by the first detector.

Consequently, when it is determined that the imaging lens is positioned close to the focus position, the focus position of the imaging lens can be specified efficiently and accurately.

The present invention is also directed to a method of autofocusing an imaging lens.

As described above, the present invention has been achieved in consideration of the problems of the conventional techniques and its object is to realize an autofocusing technique capable of eliminating the influence of a pseudo peak and appropriately achieving focus on the subject.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings.

Figure 1:
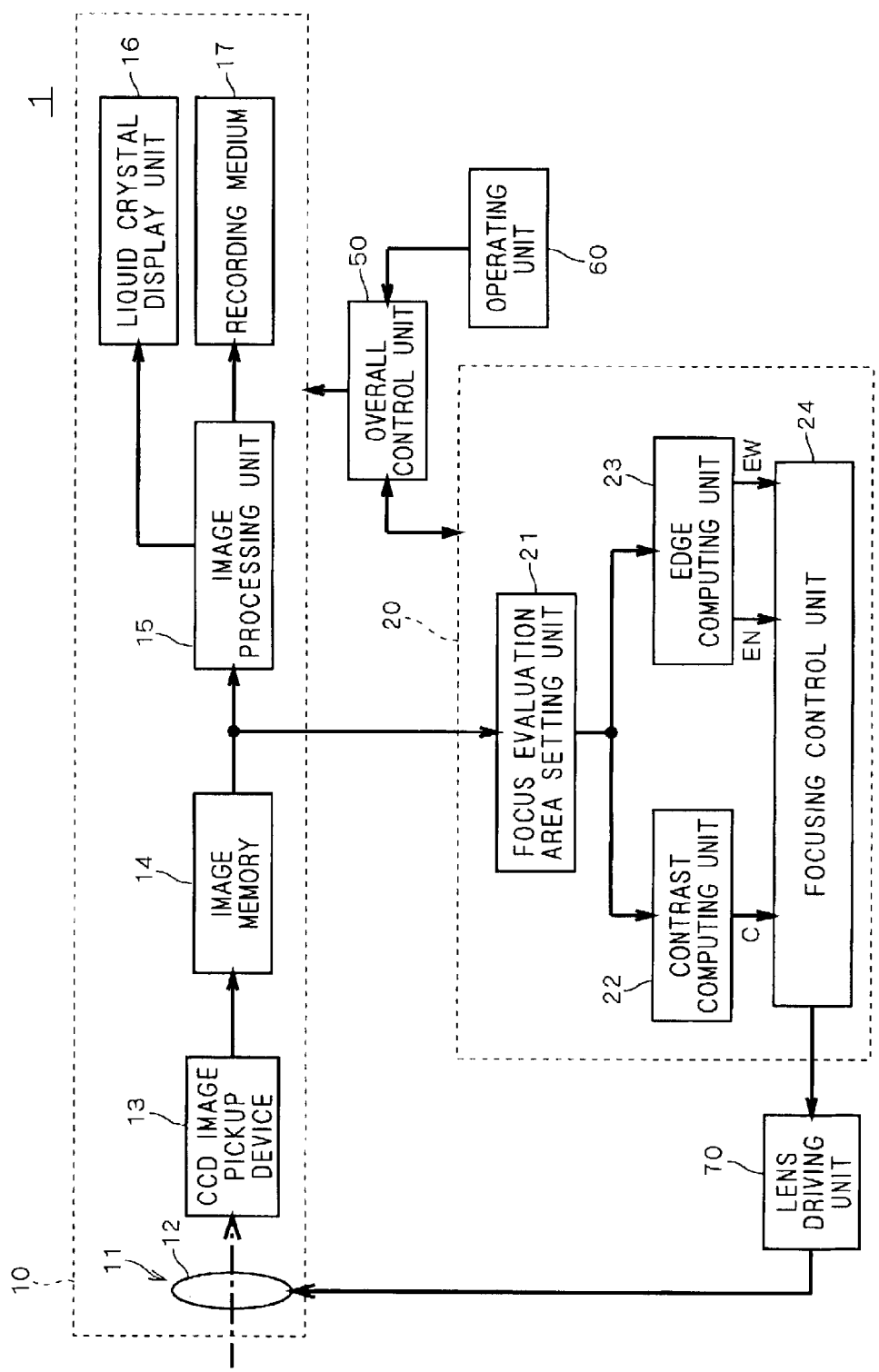
FIG. 1 is a block diagram showing the configuration of a digital camera.

FIG. 1 is a block diagram showing the configuration of a digital camera 1 to which an autofocusing apparatus according to the present invention is applied.

The digital camera 1 is constructed by including: an image capturing function unit 10 realizing an image capturing function for capturing an image of a subject; an autofocusing control unit 20 for receiving an image signal generated by the image capturing operation in the image capturing function unit 10 and performing a focusing control of an imaging lens 11; an overall control unit 50 for controlling general operations of the digital camera 1 including the image capturing function unit 10 and the autofocusing control unit 20; an operation unit 60 including operation buttons such as a shutter button; and a lens driving unit 70 for driving the imaging lens 11 on the basis of a control signal from the autofocusing control unit 20.

The image capturing function unit 10 includes: the imaging lens 11 including a focusing lens 12 being movable in the optical axis direction by the driving of the lens driving unit 70; a CCD image pickup device 13 for photoelectrically converting an image of the subject entering via the imaging lens 11 to generate image data (data consisting of a sequence of pixel data of pixels); an image memory 14 for temporarily storing the image data from the CCD image pickup device 13; an image processing unit 15 for performing a predetermined image process such as a color converting process or an image compressing process on the image data obtained from the image memory 14; a liquid crystal display unit 16 for displaying an image for display subjected to the image process for image display by the image processing unit 15; and a recording medium 17 for recording the captured image subjected to the image process for recording in the image processing unit 15.

The image capturing function unit 10 is constructed to perform, by control of the overall control unit 50, a live view image capturing operation for displaying a live view image on the liquid crystal display unit 16 before image capture, and an image capturing operation for capturing an image to be recorded on the recording medium 17 when the shutter button is fully depressed. In the live view image capturing operation, as compared with the image capturing operation, a relatively simple image process is performed by the image processing unit 15. Even if the liquid crystal display unit 16 is in an off state, at least at the time of an autofocusing control, the image capturing operation by the CCD image pickup device 13 is performed.

The autofocusing control unit 20 is constructed by including: a focus evaluation area extracting unit 21 for extracting image components in a focus evaluation area from the image memory 14 on the basis of a focus evaluation area which is preset in order to evaluate the focus state of an image; a contrast computing unit 22 for computing a contrast value C of an image on the basis of the image components of the focus evaluation area; an edge computing unit 23 for performing computation regarding an edge component of the image on the basis of the image components of the focus evaluation area to thereby obtain the number of edges EN and an edge width of center of gravity value EW; and a focusing control unit 24 for determining a focus state of the image on the basis of the contrast value C, the number of edges EN and the edge width center of gravity value EW, specifying a focus position of the imaging lens 11, and transmitting a control signal for lens driving to the lens driving unit 70. The functions of the parts in the autofocusing control unit 20 may be realized by executing a predetermined program by the CPU.

The overall control unit 50 makes the autofocusing control unit 20 function so that the image component in the focus evaluation area properly comes in focus when, for example, the shutter button is touched, and controls to perform the image capturing operation in the image capturing function unit 10 when the shutter button is fully depressed. Before the image capturing operation, as the live view image capturing operation, the overall control unit 50 allows the image capturing function unit 10 to perform a sequential image capturing operation and allows the liquid crystal display unit 16 to display images sequentially updated or supply the images to the autofocusing control unit 20.

The lens driving unit 70 moves the focusing lens 12, for example, from the far side to the near side on the basis of a control signal supplied from the focus control unit 24 in the autofocusing control unit 20. The driving pitch at this time is designated by the focus control unit 24. The lens position (focus position) in which the image component in the focus evaluation area comes in focus is specified in the autofocusing control unit 20. When the focus position is designated by the focus control unit 24, the lens driving unit 70 moves the focusing lens 12 to the designated lens position to form an image in a state where the image component in the focus evaluation area is in focus onto the CCD image pickup device 13.

At the time of performing the autofocusing control in the digital camera 1 with such a configuration, each time the focusing lens 12 is driven, the contrast of the image is evaluated from the image components in the focus evaluation area by the autofocusing control unit 20 and, moreover, whether the focusing lens 12 is near the focus position or not is determined from the edge component of the image component. When it is determined from the edge component that the focusing lens 12 is not near the focus position, even if the contrast shows its peak, the peak position is not employed as the focus position.

Figure 2:
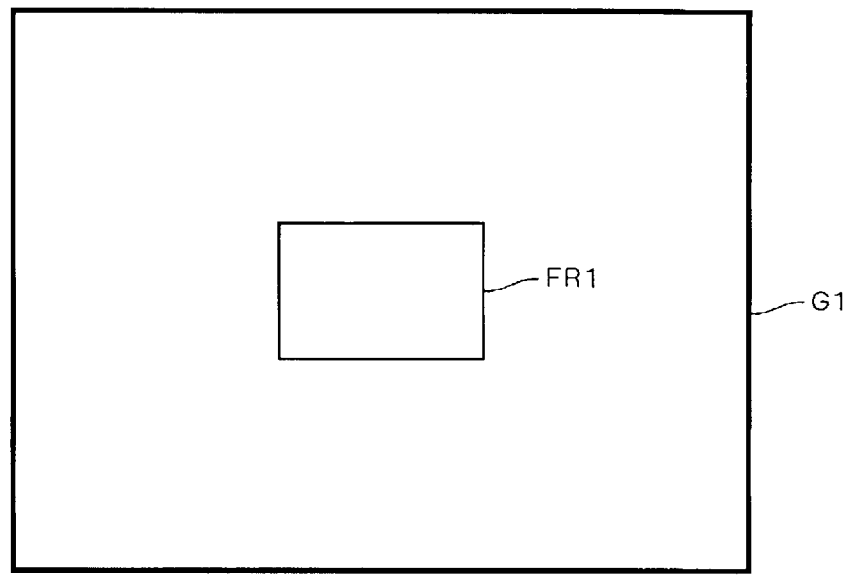
FIG. 2 is a diagram showing an example of a focus evaluation area.

FIG. 2 is a diagram showing an example of a focus evaluation area FR1. In FIG. 2, an image G1 is an image obtained by the image capturing operation of the CCD image pickup device 13. In the embodiment, as shown in FIG. 2, the focus evaluation area FR1 is set almost in the center portion of the image G1. In the autofocusing control unit 20, the contrast and edge components of the image are evaluated on the basis of the image components included in the focus evaluation area FR1. The focus evaluation area FR1 shown in FIG. 2 is an example. At the time of applying it to the digital camera 1 or the like in practice, another focus evaluation area may be set. A plurality of focus evaluation areas may be set in the image G1.

In the autofocusing control unit 20, first, the focus evaluation area extracting unit 21 extracts an image component corresponding to the focus evaluation area FR1 from the image stored in the image memory 14.

The CCD image pickup device 13 has a pixel arrangement structure of a so-called Bayer array. When the image capturing operation is performed by the CCD image pickup device 13, pixel data of each of color components of R (red), G (green) and B (blue) of the whole screen according to the Bayer array is stored into the image memory 14.

Consequently, when the focus evaluation area extracting unit 21 extracts the image components of the focus evaluation area FR1, pixel data of each of the color components corresponding to the focus evaluation area FR1 is extracted.

The image components extracted by the focus evaluation area extracting unit 21 are supplied to the contrast computing unit 22 and the edge computing unit 23.

Figure 3:
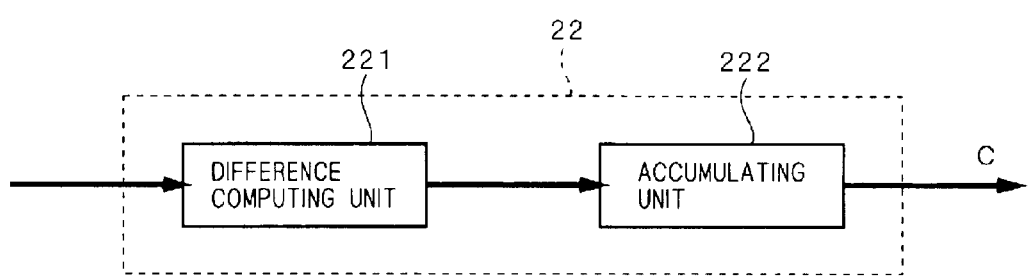
FIG. 3 is a block diagram showing the detailed configuration of a contrast computing unit.

The contrast computing unit 22 has a configuration as shown in FIG. 3. Specifically, the contrast computing unit 22 has a difference computing unit 221 for computing the absolute value of the difference between a target pixel and a pixel adjacent to the target pixel and having a predetermined positional relation with the target pixel, and an accumulating unit 222 for accumulating the difference computation results. The difference computing unit 221 performs computation until all of pixels included in the focus evaluation area FR1 are selected as target pixels. The accumulating unit 222 adds up the difference absolute values obtained when each of the pixels included in the focus evaluation area FR1 is selected as a target pixel and, finally, obtains a contrast value C of the focus evaluation area FR1.

At the time of computing the contrast value C in the contrast computing unit 22, computation may be performed on the basis of pixel data of color components of R, G and B obtained from the image memory 14, or it is also possible to once generate luminance data from pixel data of color components of R, G and B and execute computation on the basis of the luminance data.

Figure 4:
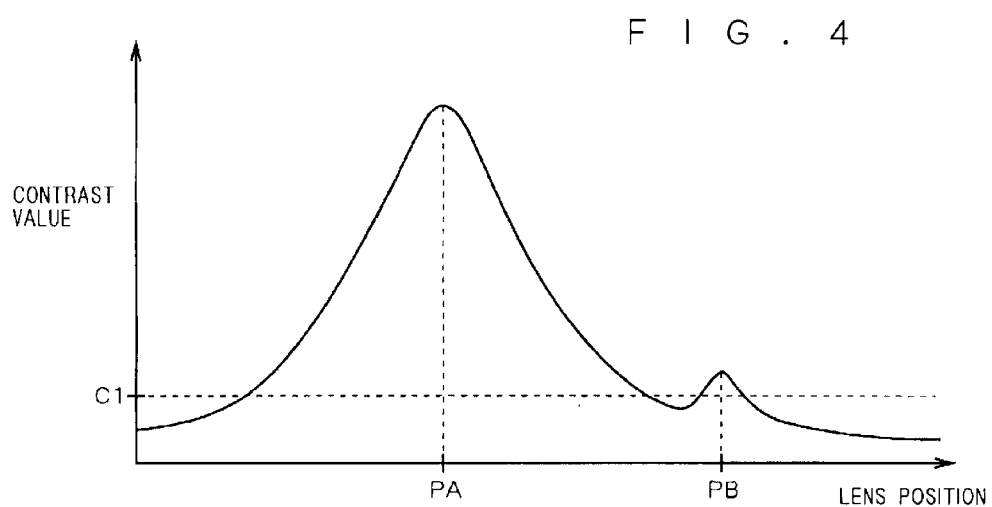
FIG. 4 is a diagram showing an example of change in a contrast value.

FIG. 4 is a diagram showing change in the contrast value C computed by the contrast computing unit 22 from an image captured in each lens position when the lens position of the focusing lens 12 is moved from the far side to the near side. As shown in FIG. 4, when the image component in the focus evaluation area FR1 enters a focus state, the contrast value C becomes the maximum value. Therefore, in the contrast curve shown in FIG. 4, a lens position PA is a focus position.

As shown in FIG. 4, camera movement or the like occurs in a lens position PB, and a pseudo peak occurs in the contrast value C. Generally, in the case where the contrast value C is smaller than a predetermined value C1 in an autofocusing control of the contrast method (hill climbing method), the contrast is determined to be low, and such a peak position is not specified as a focus position. However, in the case where the pseudo peak has a value equal to or larger than the predetermined value C1, there is the possibility that such a pseudo peak is erroneously determined as a focus position. Consequently, in the embodiment, to prevent such a pseudo peak from being erroneously determined as a focus position, computation regarding an edge component is performed in the edge computing unit 23.

Figure 5:
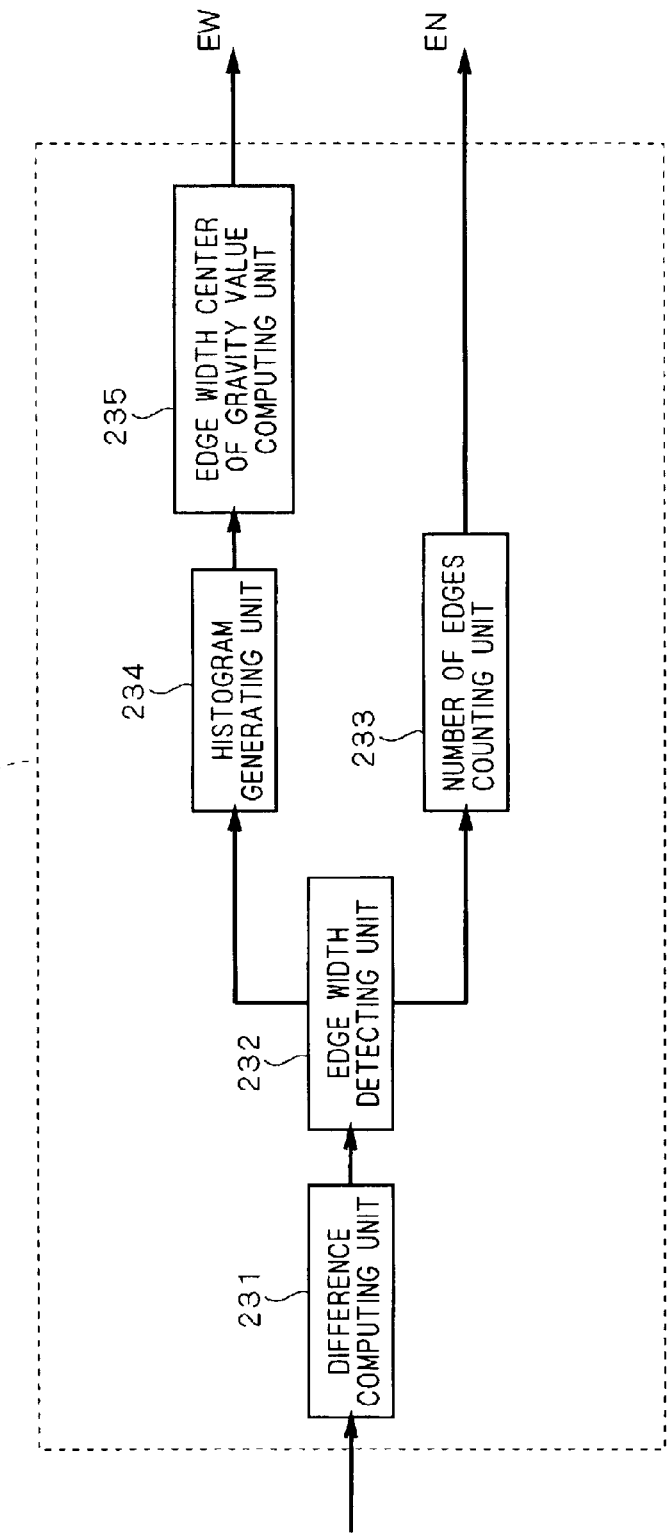
FIG. 5 is a block diagram showing the detailed configuration of an edge computing unit.

FIG. 5 is a block diagram showing the configuration of the edge computing unit 23. The edge computing unit 23 determines whether an edge component exists or not by computing the difference value between pixels neighboring in the horizontal direction with respect to image components of the focus evaluation area FR1. In the case where the edge component exists, the number of edges EN and the edge width center of gravity value EW are obtained. For this purpose, the edge computing unit 23 has a difference computing unit 231, an edge width detecting unit 232, a number of edges counting unit 233, a histogram generating unit 234, and an edge width center of gravity value computing unit 235.

Figure 6:
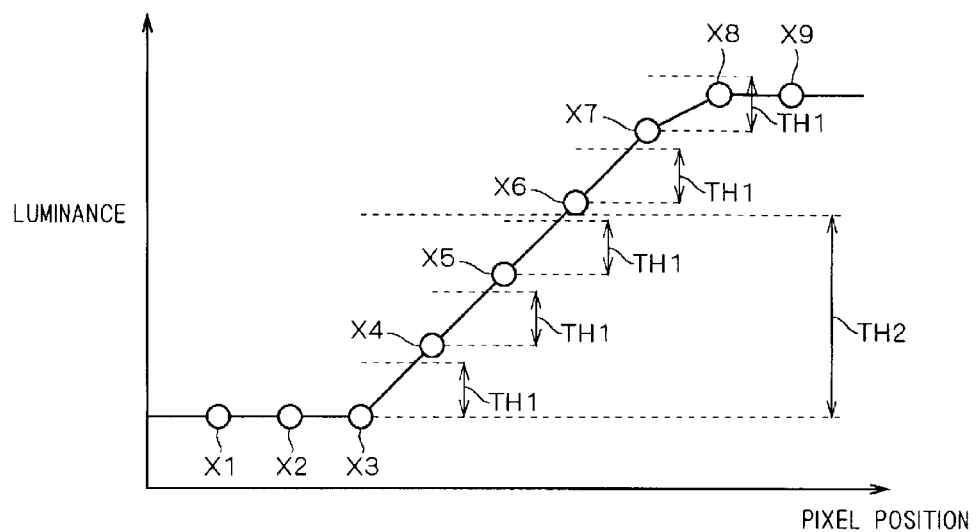
FIG. 6 is a diagram showing the concept of a computing process in the edge computing unit.

FIG. 6 is a diagram showing the concept of a computing process in the edge computing unit 23. In FIG. 6, pixels X1 to X9 express pixels disposed continuously in the horizontal direction in the focus evaluation area FR1.

When pixel data of each of color components of pixels neighboring in the horizontal direction is received, the difference computing unit 231 obtains a luminance value corresponding to the pixel, and calculates the difference value between the luminance value and a luminance value of the immediately preceding pixel. For example, in FIG. 6, when pixel data of each of color components with respect to the pixel X2 is received, the difference computing unit 231 computes the luminance value of the pixel X2, and calculates the difference value (X2−X1) between the luminance value of the pixel X1 and the luminance value of the pixel X2.

In the difference computation at this time, for example, computation of subtracting the luminance value of the immediately preceding pixel from the luminance value of a target pixel is performed. When the sign of the difference value as a result of computation is positive, the edge component which increases is detected. When the sign is negative, the edge component which decreases is detected. In the embodiment, however, it is sufficient to finally obtain the number of edges EN and the edge width center of gravity value EW and it is not necessary to strictly discriminate whether each edge component is increasing or decreasing.

When pixel data of the pixel X3 is received, the difference computing unit 231 obtains the luminance value of the pixel X3 and calculates the difference value between the luminance value of the pixel X3 and the luminance value of the pixel X2. After that, the difference computing unit 231 calculates the luminance value each time the pixel data of the pixels X4, X5, X6, . . . distributed in the horizontal direction are sequentially received, and performs an operation of computing the difference between the luminance value of the pixel and that of the immediately preceding pixel.

The difference value calculated by the difference computing unit 231 is supplied to the edge width detecting unit 232.

In the edge width detecting unit 232, a first threshold TH1 and a second threshold TH2 are preset. The first threshold TH1 is a threshold to determine whether the difference value between neighboring pixels indicates an edge component or not. The second threshold TH2 is a threshold to determine whether the edge component has sufficient strength or not.

When the difference value of the luminance values is obtained from the difference computing unit 231, the edge width detecting unit 232 compares the difference value with the threshold TH1. If the difference value is equal to or larger than the threshold TH1 as a result of the comparison, it is determined that the pixel serves as an edge component, and the edge width count value is incremented only by "1". For example, in the case where the difference value between the pixels X4 and X3 shown in FIG. 6 is received, the difference value exceeds the threshold TH1, so that the edge width detecting unit 232 increments the edge width count value only by "1". Sequentially, similar processes are repeated. Since each of the difference value between the pixels X5 and X4, the difference value between the pixels X6 and X5, and the difference value between the pixels X7 and X6 exceeds the threshold TH1, the edge width detecting unit 232 increments the edge width count value only by "1" in each of the determining processes.

When the difference value between the pixels X8 and X7 is obtained, since the difference value is smaller than the threshold TH1, the end of the edge component is recognized, and the total value of the difference values at which the edge width count values have been incremented is compared with the second threshold TH2. In the case of FIG. 6, since the difference value between the luminance value of the pixel X7 and the luminance value of the pixel X3 is equal to or larger than the threshold TH2, it is detected that the edge component has sufficient strength. The edge width detecting unit 232 specifies the edge width count value counted until then as the edge width of the edge component. In the case where the difference value between the neighboring pixels becomes smaller than the threshold TH1 and the edge width count value is equal to or larger than 1, it means that an edge component is detected. If the strength of the edge component is predetermined strength (threshold TH2) or higher, the edge component is recognized as an effective edge component.

Even in the case where the difference value between neighboring pixels becomes smaller than the threshold TH1 and the edge width count value is 1 or larger, if the strength of the edge component is less than predetermined strength (threshold TH2), the edge component is not recognized as an effective edge component.

Even in the case where the difference value between the neighboring pixels is smaller than the threshold TH1, if the edge width count value is 0, it is unnecessary to determine whether the edge component is effective or not. It is sufficient to determine whether each of difference values which are sequentially input is equal to or larger than the threshold TH1.

In the example of FIG. 6, only after the difference value between the pixels X4 and X3 is obtained, the edge width count value becomes 1. After that, the edge width count value is sequentially incremented. When the difference value between the pixels X8 and X7 is finally obtained and the end portion of the edge component is recognized, the edge width count value is 4. Since the edge component constructed by the pixels X3 to X7 exceeds the threshold TH2, the edge component is recognized as an effective one.

In the case where an effective edge component is detected in the edge width detecting unit 232, the edge width count value of the detected edge component is supplied to the histogram generating unit 234 and an instruction of counting the number of edges is given to the number of edges counting unit 233.

When the edge width count value is given to the histogram generating unit 234, the edge width detecting unit 232 resets the edge width count value to "0" and repeats the edge width detecting process on the basis of the difference value which is received after that, thereby detecting an effective edge component in all of image components of the focus evaluation area FR1.

The number of edges count unit 233 preliminarily initializes the count value of the number of edges to "0". Each time the instruction of counting the number of edges is given from the edge width detecting unit 232, the edge number count unit 233 increments the count value of the number of edges only by "1". In such a manner, the effective edge components included in the image components in the focus evaluation area FR1 can be counted, and the number of edges EN is output finally.

Figure 7:
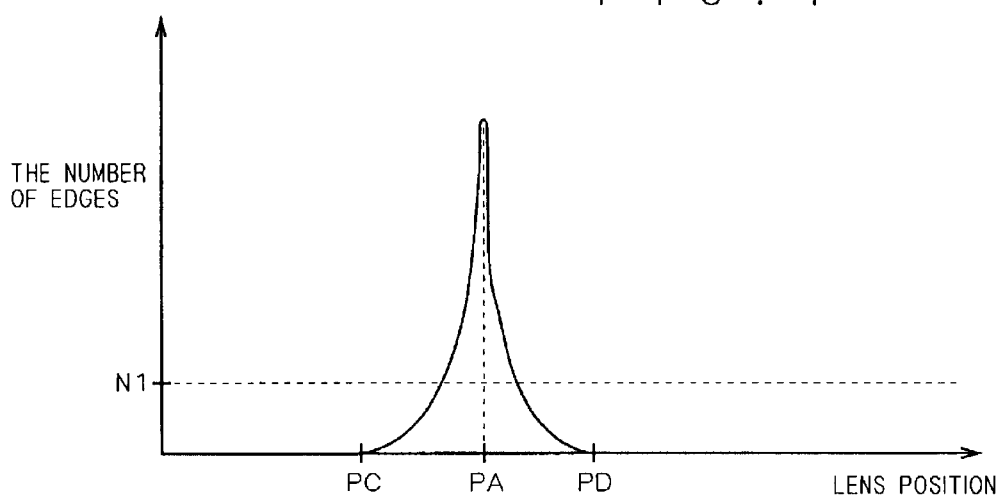
FIG. 7 is a diagram showing the relation between a lens position and the number of edges.

FIG. 7 is a diagram showing the relation between a lens position and the number of edges in the case of obtaining the number of edges EN from an image obtained in each lens position of the focusing lens 12. As shown in FIG. 7, when the image component included in the focus evaluation area FR1 is in a focus state, a clear image is obtained, so that the number of edges is the maximum value. Consequently, the focusing lens 12 achieves focus in the lens position PA. The clearness of an image decreases as the image component included in the focus evaluation area FR1 is apart from the focus state. When an image becomes blurred to some extent, no effective edge component is detected from the image components in the focus evaluation area FR1. Assuming that there is no influence of noise, when the focusing lens 12 is in a position in the range between the lens positions PC and PD, the number of edges EN indicates a value other than "0". When the focusing lens 12 is in a position out of the range between the lens positions PC and PD, the number of edges EN becomes "0".

Even if an influence of noise is considered to some extent, when an image component in the focus evaluation area FR1 is closely in a focus state, the number of edges EN is often a value equal to or larger than a threshold N1. When the image components are not close to a focus state, the number of edges EN is often a value less than the threshold N1.

Therefore, by referring to the number of edges EN counted by the number of edges counting unit 233, whether an image component in the focus evaluation area FR1 is close to a focus state or not can be determined when the focusing lens 12 is in a lens position.

The histogram generating unit 234 generates a histogram of edge components included in the focus evaluation area FR1 on the basis of an edge width count value obtained from the edge width detecting unit 232.

Figure 8:
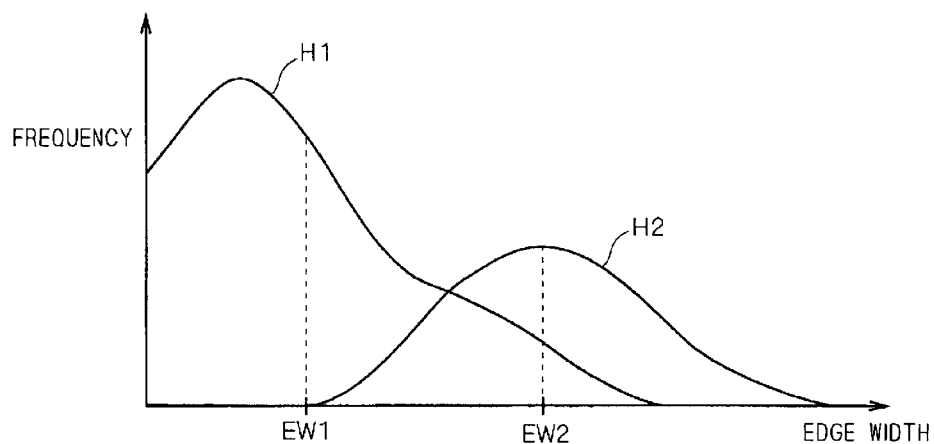
FIG. 8 is a diagram showing a histogram of an edge width.

FIG. 8 is a diagram showing histograms of edge components. In FIG. 8, a distribution curve H1 indicates that an image component in the focus evaluation area FR1 is close to a focus state, and a distribution curve H2 shows that an image component in the focus evaluation area FR1 is not close to a focus state.

As shown in FIG. 8, when the histogram generating unit 234 generates a histogram regarding an edge width from image components when the focusing lens 12 is in a lens position on the basis of the edge width count value obtained from the edge width detecting unit 232, the distribution state of the edge width shows a distribution according to a focus state of image components. Specifically, when an image component in the focus evaluation area FR1 is close to a focus state, the clearness of an image increases, so that the edge width is generally narrowed, and the edge width is distributed in an area in which the edge width is relatively small. On the other hand, the clearness of an image decreases as the image component of the focus evaluation area FR1 is apart from the focus state, and the edge width shifts so as to be distributed in an area in which the edge width is relatively large. When an image becomes blurred to some extent, the effective edge component cannot be detected from the image components of the focus evaluation area FR1, so that an edge width distribution curve is not obtained at all.

When a histogram of an edge component is generated by the histogram generating unit 234, the edge width center of gravity value computing unit 235 functions and the edge width center of gravity value EW is obtained from the histogram. The edge width center of gravity value computing unit 235 performs a weighted average computation on the basis of a histogram distribution of edge components, thereby obtaining an average value of edge widths, and the value obtained as a result is used as the edge width center of gravity value EW.

For example, in the case of the histogram distribution expressed by the distribution curve H2 in FIG. 8, the edge width center of gravity value computing unit 235 computes a value EW2 of center of gravity of edge width by performing the weighted average computation. In the case of the histogram distribution expressed by the distribution curve H1 in FIG. 8, the edge width center of gravity value computing unit 235 obtains an edge width center of gravity value EW1 by performing weighted average computation.

The edge width center of gravity value EW1 gradually decreases as the image component is approaching a focus state, and is converged to a certain value.

Figure 9:
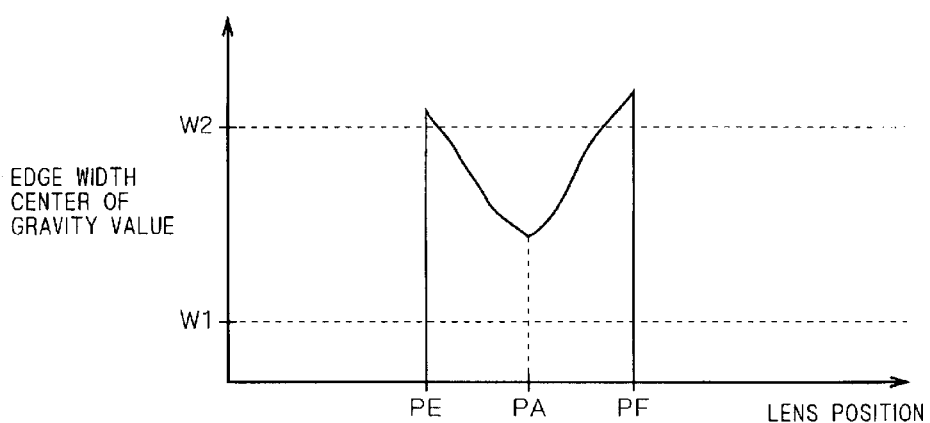
FIG. 9 is a diagram showing the relation between a lens position and a value of center of gravity of an edge width.
Figure 10:
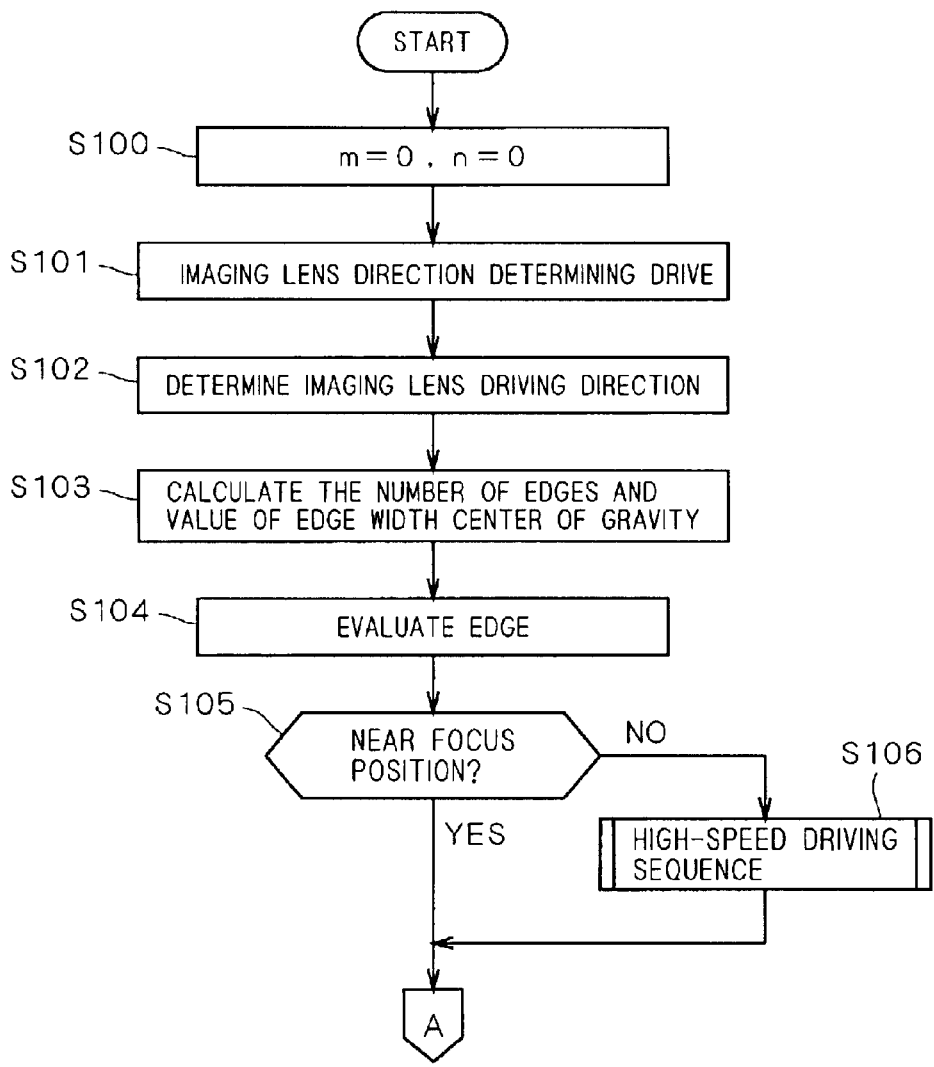
FIG. 10 is a flowchart showing a processing sequence of an autofocusing control.

FIG. 9 is a diagram showing the relation between a lens position and an edge width center of gravity value in the case of computing the edge width center of gravity value EW from an image obtained in each lens position of the focusing lens 12. As shown in FIG. 9, when an image component included in the focus evaluation area FR1 is in a focus state, a clear image is obtained, so that the edge width center of gravity value is the minimum value. Consequently, the focusing lens 12 achieves focus in the lens position PA. As the image component included in the focus evaluation area FR1 becomes apart from the focus state, the clearness of an image decreases. When the edge width center of gravity value EW increases and an image becomes blurred to some extent, no effective edge component is detected from image components of the focus evaluation area FR1. That is, in the relation between the edge width center of gravity value EW and the lens position, the edge width center of gravity value EW shows an M-shaped characteristic as shown in FIG. 9.

Assuming now that there is no influence of noise, when the focusing lens 12 is in a position in the range between the lens positions PE and PF, the edge width center of gravity value EW is a value other than 0. When the focusing lens 12 is out of the range between the lens positions PE and PF, the edge width center of gravity value EW is 0. The lens position PE almost coincides with the lens position PC shown in FIG. 7, and the lens position PF almost coincides with the lens position PD shown in FIG. 7.

Even if an influence of noise is considered to some extent, when the image component in the focus evaluation area FR1 is close to a focus state, the edge width center of gravity value EW is often a value equal to or larger than the threshold W1 and is less than the threshold W2. When the image component is not close to the focus state, the edge width center of gravity value EW is often less than the threshold W1 or equal to or larger than the threshold W2.

Therefore, by referring to the edge width center of gravity value EW computed in the edge width center of gravity value computing unit 235, when the focusing lens 12 is in a certain lens position, whether the image component in the focus evaluation area FR1 is close to the focus state or not can be determined.

The focusing control unit 24 evaluates the focus state of the focus evaluation area FR1 on the basis of the number of edges EN and the edge width center of gravity value EW obtained from the edge computing unit 23, and performs a focusing control on the basis of the contrast value C obtained from the contrast computing unit 22.

The focusing control unit 24 drives the focusing lens 12 included in the imaging lens 11 step by step. When the number of edges EN derived from an image in a certain lens position indicates a value equal to or larger than a predetermined value (threshold N1 shown in FIG. 7) and the edge width center of gravity value EW is in a predetermined range (equal to or larger than the threshold W1 and less than the threshold W2 shown in FIG. 9), the focus control unit 24 determines that the lens position is close to the focus position PA. In this case, the lens driving direction is specified so as to increase the contrast value C, and focus evaluation based on the contrast value C is made while driving the focusing lens 12 to the direction.

That is, whether the lens position is close to the focus position or not is determined by using, as a focus position proximity determining condition, the case where the number of edges EN is equal to or larger than the predetermined value (threshold N1 shown in FIG. 7) and the edge width center of gravity value EW at that time is within the predetermined range (equal to or larger than the threshold W1 and less than the threshold W2 shown in FIG. 9).

When it is determined by the focus position proximity determination that the lens position is not close to the focus position PA, the lens driving direction is specified so that the contrast value C increases, and the focusing lens 12 is driven at high speed. By the high-speed driving, the focusing lens 12 can be efficiently moved close to the focus position, and the image component in the focus evaluation area FR1 can be promptly led to the focus state promptly by efficiently performing the autofocusing control.

The reason why the focus control unit 24 uses both the number of edges EN and the edge width center of gravity value EW as objects to be evaluated at the time of evaluating an edge component will now be described. Generally, since an edge component of an image is a high frequency component, the edge component has a property such that it is vulnerable to an influence of noise. Consequently, in the embodiment, by using the number of edges EN and the edge width center of gravity value EW as different index values regarding the edge component, the influence of noise is reduced, and more-reliable determination of whether the lens position is close to the focus position or not is realized.

Whether the lens position is near the focus position or not may be determined on the basis of only the number of edges EN out of the number of edges EN and the edge width center of gravity value EW. In this case, the focus position proximity determining condition is that the number of edges EN is equal to or larger than the predetermined value (threshold N1 shown in FIG. 7). The edge width center of gravity value EW is more vulnerable to an influence of noise near the focus position as compared with the number of edges EN. In the case of using one of the number of edges EN and the edge width center of gravity value EW as an object of evaluation, it is therefore preferable to use the number of edges EN as an object to be evaluated.

With the configuration, the focus evaluation area extracting unit 21 extracts the image component in the focus evaluation area from an image signal when the focusing lens 12 is in a certain lens position. On the basis of the image component, the contrast computing unit 22 can compute the contrast value C and give it to the focusing control unit 24. The edge computing unit 23 may compute the number of edges EN and the edge width center of gravity value EW on the basis of the image component and give them to the focusing control unit 24. The focusing control unit 24 determines whether the focusing lens 12 is positioned near the focus position or not on the basis of the number of edges EN and the edge width center of gravity value EW obtained from the edge computing unit 23. When it is determined that the focusing lens 12 is not positioned near the focus position, even if the contrast value C shows its peak, the lens position is not employed as a focus position. As a result, the lens position showing a pseudo peak can be excellently prevented from being erroneously detected as a focus position.

The processing sequence of the autofocusing process performed in the digital camera 1 with the configuration will now be described. FIGS. 10 to 14 are flowcharts showing the processing sequence of the autofocusing control.

When the shutter button is pressed first and the autofocusing control is started, the autofocusing control unit 20 initializes each of count values m and n to "0" (step S100). The autofocusing control unit 20 moves the focusing lens 12 included in the imaging lens 11 to the lens initial position, and obtains the contrast value from an image derived from the CCD image pickup device 13 in the lens initial position.

The focusing control unit 24 makes a direction determining drive of an amount of 12 Fδ of the focusing lens 12 included in the imaging lens 11 from the lens initial position to the near side (step S101). F denotes the F number of the imaging lens 11 and δ denotes a so-called permissible circle of confusion. In the case of the digital camera 1, the amount corresponds to the pitch of one or a few pixels of the CCD image pickup device 13. The autofocusing control unit 20 obtains the contrast value from the image derived from the CCD image pickup device 13 in the lens position.

At the time of obtaining the contrast value in steps S100 and S101, the contrast computing unit 22 functions in the autofocusing control unit 20. The direction determination drive amount is not limited to 12 Fδ.

In the autofocusing control unit 20, the focusing control unit 24 functions to compare the contrast value in the lens initial position and the contrast value in the lens position after driving of 12 Fδ and determine the lens driving direction of the focusing lens 12 (step S102). Specifically, it is estimated that the focus position of the focusing lens 12 exists in the direction of increasing the contrast value as one of the contrast value in the lens initial position and the contrast value in the lens position after driving of 12 Fδ, and the direction of increasing the contrast value is determined as the lens driving direction.

Subsequently, the autofocusing control unit 20 determines a lens driving form (steps S103 to S105). As the lens driving forms, there are a driving form of slightly driving the focusing lens 12 to detect the focus position of the focusing lens 12 and a driving form of moving the focusing lens 12 close to the focus position by driving the focusing lens 12 at a low pitch at high speed.

In the autofocusing control unit 20, the edge computing unit 23 functions and, on the basis of an image obtained at this time point, calculates the number of edges EN and the edge width center of gravity value EW (step S103). The focusing control unit 24 evaluates the number of edges EN and the edge width center of gravity value EW (step S104), and determines whether the focusing lens 12 is positioned near the focus position or not (step S105). The determination is made by determining whether the number of edges EN and the edge width center of gravity value EW calculated in step S103 satisfy the above-described focus position proximity determining condition or not. When the focus position proximity determining condition is satisfied, to detect the focus position of the focusing lens 12, the program advances to step S107 in the flowchart of FIG. 11. If the condition is not satisfied, to move the focusing lens 12 close to the focus position, the program advances to step S106 and shifts to a high-speed driving sequence.

Figure 13:
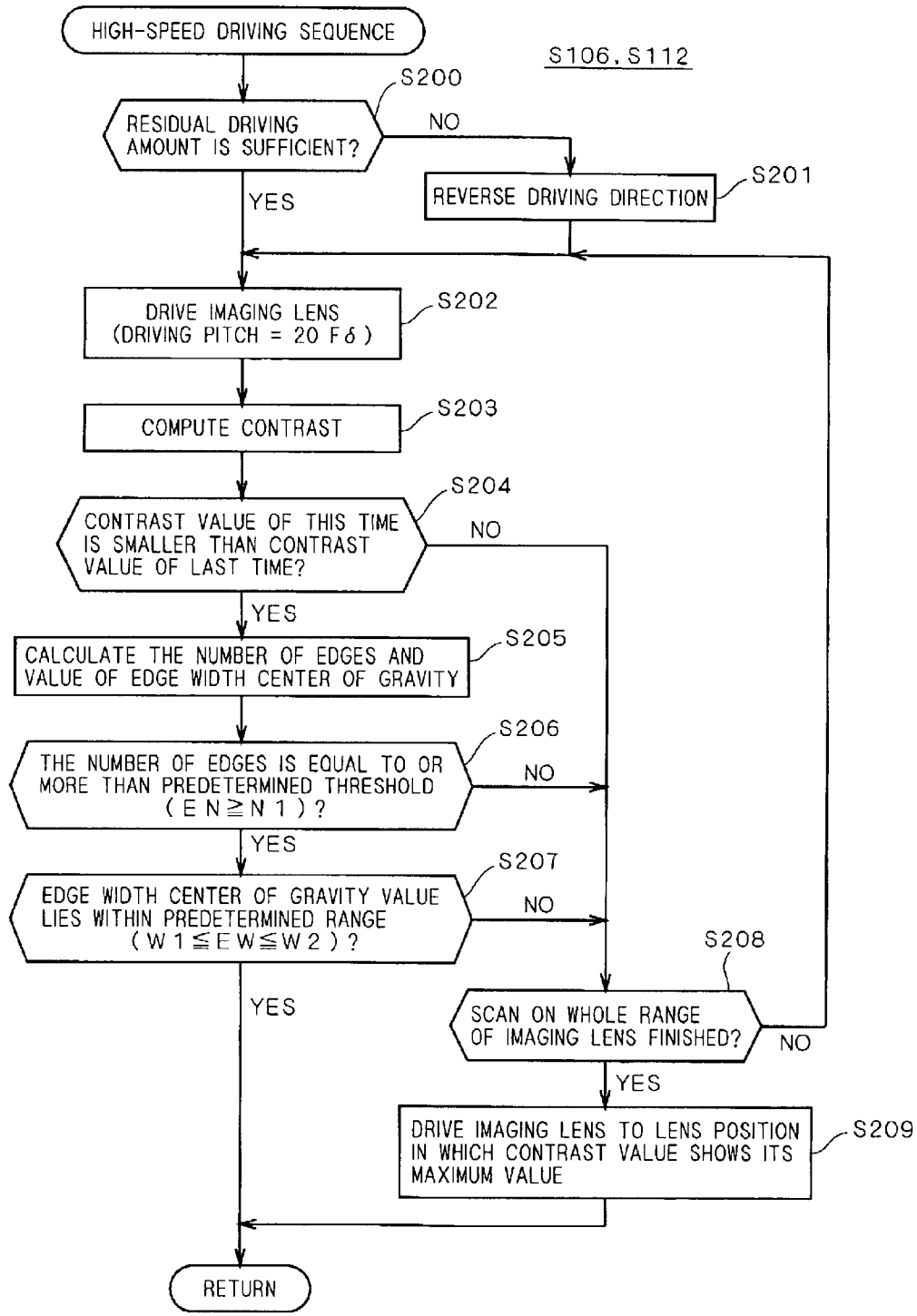
FIG. 13 is a flowchart showing a detailed procedure of a high-speed driving sequence.

The high-speed driving sequence (step S106) will now be described. The flowchart of FIG. 13 shows the detailed procedure of the high-speed driving sequence.

First, the focusing control unit 24 determines whether a remaining drive amount for driving the focusing lens 12 at high speed in the lens driving direction is sufficient or not (step S200). If there is a sufficient remaining drive amount, the program advances to step S202. If there is not a sufficient remaining drive amount, the program advances to step S201 where the lens driving direction is reversed. In the embodiment, the driving pitch as a drive amount at the time of performing high-speed driving is set to 20 Fδ. Consequently, in the determination in step S200, a process of checking whether the remaining drive amount of the focusing lens 12 is 20 Fδ or larger is performed. If the remaining drive amount is not 20 Fδ or larger, in step S201, the lens driving direction is reversed and the program advances to step S202.

The focusing control unit 24 drives the focusing lens 12 in the determined lens driving direction at high speed and at a drive pitch of 20 Fδ (step S202). It can prevent the focusing lens 12 which is not near the focus position from being driven at a small pitch (for example, 4 Fδ) which takes long time to detect the focus position. Thus, the autofocusing control can be performed efficiently.

In the autofocusing control unit 20, the contrast computing unit 22 functions and performs computation of obtaining the contrast value from an image formed in the lens position after high-speed drive (step S203). Whether the contrast value obtained at this time is smaller than the contrast value determined last time or not is determined (step S204). By the determination, whether the focusing lens 12 has passed over the focus position by the high-speed drive or not can be determined. When it is determined that the focusing lens 12 has not passed over the focus position yet, the program advances to step S209.

On the other hand, when it is determined that the focusing lens 12 has passed over the focus position, the program advances to step S205 where the edge computing unit 23 functions to compute the number of edges EN and the edge width center of gravity value EW from an image obtained in the lens position after the high-speed drive (step S205). Whether the number of edges EN obtained at this time is equal to or larger than a predetermined threshold N1 is determined (step S206). If "YES", whether the edge width center of gravity value EW lies within a predetermined range (W1≦EW≦W2) or not is further determined (step S207).

When it is determined that the number of edges EN is equal to or larger than the predetermined threshold N1 in step S206, and it is determined that the edge width center of gravity value EW lies within the predetermined range (W1≦EW≦W2) in step S207, the focus position proximity determining conditions by using the edge component are satisfied. The focusing control unit 24 therefore recognizes that the focusing lens 12 is positioned near the focus position.

In the case where it is determined that the conditions are not satisfied in step S206 or S207, the program advances to step S208.

In step S208, the focus control unit 24 determines whether or not the focusing lens 12 has been driven at high speed in the whole range where the focusing lens 12 is movable, that is, whether the whole-range scan has been finished or not.

In the case where the movable range for driving the focusing lens 12 at high speed still remains, the program returns to step S202 where the focusing lens 12 is driven at high speed at the drive pitch of 20 Fδ, and the processes in steps S203 to S207 are repeated.

On the other hand, when the movable area for driving the focusing lens 12 in the current lens driving direction is not left, the program advances to step S209 where the focus control unit 24 determines the maximum value out of the contrast values obtained until then and drives the focusing lens 12 close to the lens position in which the contrast value indicates the maximum value.

In the case of obtaining an image of the subject by the digital camera 1, an edge component may not be extracted excellently depending on the type of the subject. Consequently, in the case where the number of edges EN and the edge width center of gravity value EW do not satisfy the focus position proximity determining conditions, it is considered to be preferable to perform the autofocusing control on the basis of the contrast value than to determine that it is impossible to perform the autofocusing control. In the embodiment, therefore, in the case where the lens position near the focus position, satisfying the focus position proximity determining conditions cannot be specified even when the focusing lens 12 scans the whole area, by driving the focusing lens 12 close to the lens position in which the contrast value is the maximum value in step S209, even in the case of taking an image of a subject from which edge components cannot be extracted excellently, the autofocusing control can be performed by moving the focusing lens 12 close to the focus position.

After such processes are finished, the processes of the high-speed driving sequence are finished.

Subsequently, the program advances to the flowchart of FIG. 11. In step S107, the count value m is incremented by "1". The count value m is a value for counting the number of driving times at the time of driving the focusing lens 12 at a fine pitch around the current lens position which is close to the focus position. When the focus position cannot be specified even if the lens is driven at a fine pitch a plurality of times by counting the number of driving times by using the count value m, the high-speed driving sequence is performed again.

Figure 14:
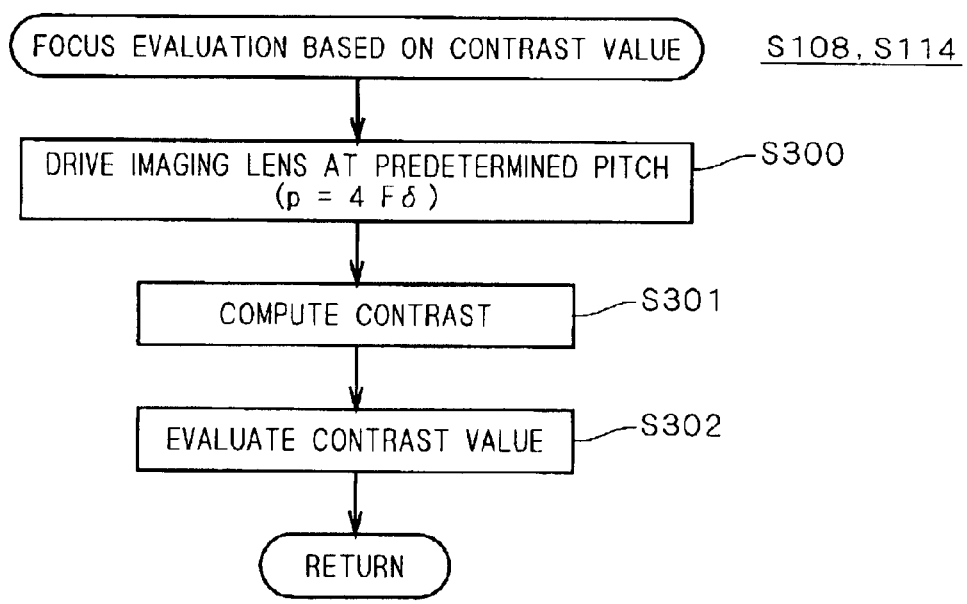
FIG. 14 is a flowchart showing a detailed procedure of a focus evaluating process based on a contrast value.

The program advances to step S108 where focus evaluation based on the contrast value is performed. The flowchart of FIG. 14 shows the detailed procedure of the focus evaluating process.

First, the focus control unit 24 drives the focusing lens 12 at a predetermined fine pitch p (for example, p=4 Fδ) in the direction of increasing the contrast value (step S300). The contrast computing unit 22 functions in the autofocusing control unit 20 and obtains the contrast value from an image derived from the CCD image pickup device 13 in the lens position after the movement (step S301).

The program advances to step S302 where the focus control unit 24 evaluates the contrast value and determines whether a lens position (focus position) in which the contrast value shows its peak can be specified or not. For example, when the contrast value calculated this time is larger than that of last time, the peak position has not been detected yet and the focus position cannot be specified. Consequently, the driving of the lens at the fine pitch (p=4 Fδ) in the lens driving direction to increase the contrast value and the contrast value computing process are repeated. On the other hand, when the contrast value calculated this time is smaller than that of last time, the contrast value of last time can be detected as the value in the peak position.

Figure 11:
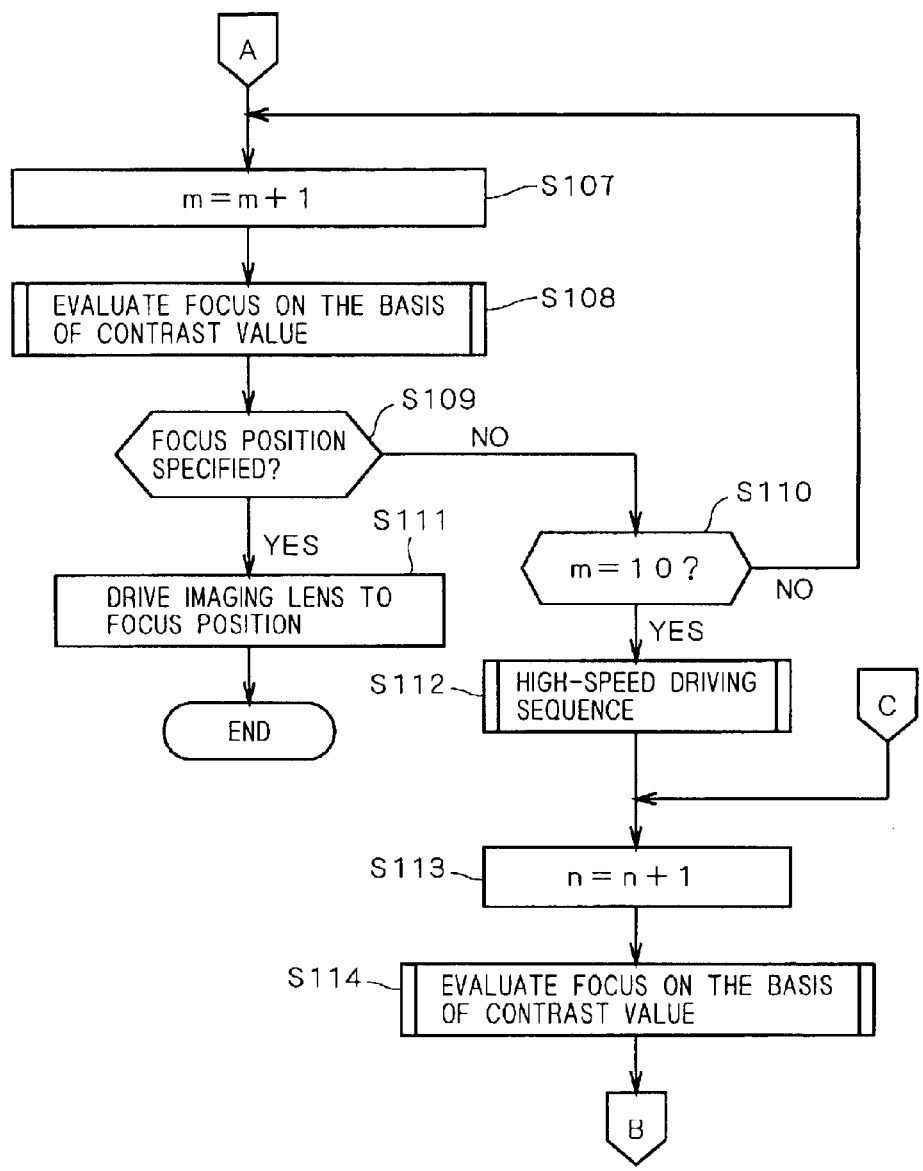
FIG. 11 is a flowchart showing a processing sequence of an autofocusing control.
Figure 12:
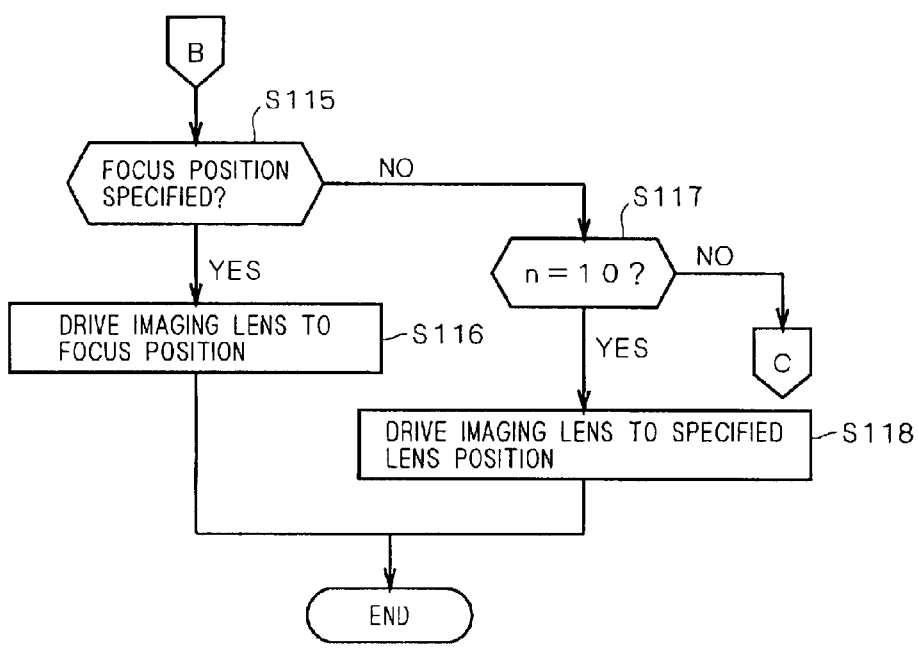
FIG. 12 is a flowchart showing a processing sequence of an autofocusing control.

Referring again to the flowchart of FIG. 11, the program advances to step S109. The focusing control unit 24 determines whether the focus position can be specified or not by determining whether the lens position in which the contrast value shows its peak can be specified or not.

In the case where the contrast peak position is detected, the program advances to step S111 where the focusing lens 12 in the imaging lens 11 is driven to the specified focus position. At this time, it is also possible to perform a contrast value interpolating process as necessary to obtain a lens position in which the contrast value shows its maximum value and specify the lens position as the focus position.

On the other hand, when the contrast peak position has not been detected yet, the program advances to step S110 where the focusing control unit 24 determines whether the count value m has reached 10 or not. If m is not equal to 10, the program returns to step S107 where the count value m is incremented by "1" and the driving of the lens at a fine pitch and the contrast value computing process are performed. Consequently, when the focus position can be specified before the number of lens driving times at the fine pitch p=4 Fδ becomes 10, the focusing lens 12 is driven to the focus position in step S111, and the image component in the focus evaluation area FR1 enters a focus state. On the other hand, when the focus position cannot be specified even the number of lens driving times at the fine pitch p=4 Fδ becomes 10 or larger, step S110 is determined positively ("YES"), and the program advances to a high-speed driving sequence (step S112).

The details of the high-speed driving sequence in step S112 are similar to those of the flowchart of FIG. 13. Therefore, by executing the high-speed driving sequence again in step S112, the focusing lens 12 is moved again close to the focus position.

When it is determined in step S105 that the focusing lens 12 is close to the focus position ("YES"), the process in step S112 is the first high-speed driving sequence.

In step S113, the focus control unit 24 increments the count value n by "1". The count value n is a value for counting the number of driving times at the time of driving the focusing lens 12 at a fine pitch around the present lens position by the high-speed driving sequence (of step S112). By counting the number of driving times by the count number n, if the focus position cannot be specified after the lens is driven at the fine pitch a predetermined number of times, the focusing lens 12 is driven to a specified lens position on assumption that the contrast of the subject itself is low.

In step S114, the focus evaluation based on the contrast value is made. The flowchart of FIG. 14 also shows the detailed procedure of the focus evaluating process. In step S114, lens driving is performed at the fine pitch p (p=4 Fδ) and the focus state is evaluated on the basis of the contrast value in the lens position.

The program advances to step S115 (in the flowchart of FIG. 12) and the focusing control unit 24 determines whether the focus position can be specified or not by determining whether the lens position in which the contrast value shows its peak can be specified or not in a manner similar to step S109.

In the case where the contrast peak position has been detected, the program advances to step S116 where the focusing lens 12 in the imaging lens 11 is driven to the specified focus position. At this time, it is also possible to perform a contrast value interpolating process as necessary to obtain a lens position in which the contrast value shows its maximum value and specify the lens position as the focus position.

On the other hand, when the contrast peak position has not been detected yet, the program advances to step S117 where the focusing control unit 24 determines whether the count value n has reached 10 or not. If n is not equal to 10, the program returns to step S113 (in FIG. 11) where the count value n is incremented by "1" and the driving of the lens at a fine pitch and the contrast value computing process are performed. Consequently, when the focus position can be specified before the number of lens driving times at the fine pitch p=4 Fδ becomes 10, the focusing lens 12 is driven to the focus position in step S116, and the image component in the focus evaluation area FR1 enters a focus state. On the other hand, when the focus position cannot be specified even the number of lens driving times at the fine pitch p=4 Fδ becomes 10 or larger, step S117 is determined positively ("YES"), and the program advances to step S118.

The process in step S118 is performed in the case where the contrast of the subject itself is low and the peak of the contrast value cannot be detected. In step S118, consequently, the focusing lens 12 is driven to a specific lens position. Examples of the specific lens position are a lens position before the autofocusing control is started and a lens position which is the furthest on assumption that the subject exists at infinity.

After that, the autofocusing control in the embodiment is finished. In the autofocusing control, the number of edges EN and the edge width center of gravity value EW are evaluated and whether the focusing lens 12 is positioned near the focus position or not is determined. Consequently, even in the case where the contrast value C shows a pseudo peak, the possibility such that a position around the lens position where such a pseudo peak exists is determined as a position close to the focus position is low. Therefore, by applying the autofocusing control in the embodiment, the pseudo peak position can be prevented from being erroneously recognized as a focus position, an influence of the pseudo peak can be eliminated, and the subject can come into focus properly.

In the autofocusing control, in the case where the number of edges EN and the edge width center of gravity value EW satisfy the focus position proximity determining conditions, the focus state is evaluated on the basis of the contrast value C. Consequently, it is unnecessary to make the edge computing unit 23 function, and the autofocusing control can be efficiently performed. An edge component is vulnerable to an influence of noise whereas the contrast value is not easily influenced by noise. Thus, by evaluating the focus state on the basis of the contrast value near the focus position, the focus position can be specified with high precision.

In the autofocusing control, when the number of edges EN and the edge width center of gravity value EW do not satisfy the focus position proximity determining conditions, the focusing lens 12 can be driven at higher speed as compared with the case where the focus position proximity determining conditions are satisfied. Therefore, the focusing lens 12 can be promptly moved close to the focus position, thereby achieving faster autofocusing control.

Further, in the autofocusing control, at the time of determining the lens driving direction of the focusing lens 12, the direction in which the contrast value increases is determined as the lens driving direction only by using the contrast value as a reference. Consequently, the direction in which the focus position can be efficiently specified is determined as a lens driving direction and efficient autofocusing control can be realized. Further, as compared with the case of specifying the lens driving direction on the basis of edge components such as the number of edges EN and the edge width center of gravity value EW, the accurate lens driving direction can be specified without being influenced by noise.

Although the embodiment of the present invention has been described above, the present invention is not limited to the foregoing embodiment.

For example, the autofocusing control unit 20 also functions as an autofocusing device for performing an autofocusing control. When the autofocusing control unit 20 is applied to an image capturing apparatus such as a camera, a proper autofocusing control without erroneously recognizing a pseudo peak as a focus position can be carried out. The autofocusing control unit 20 can be also applied to a device other than the digital camera 1.

In the description, the case of performing the autofocusing control at a timing when the shutter button is touched has been described as an example. However, a timing of performing the autofocusing control is not limited thereto.

While the invention has been shown and described in detail, the foregoing description is in all aspects illustrative and not restrictive. It is therefore understood that numerous modifications and variations can be devised without departing from the scope of the invention.

What is claimed is:

1. An autofocusing apparatus comprising:
   an image generator for generating an image signal constructed by a plurality of pixels;
   a first detector for detecting a contrast value of an image from the image signal generated by said image generator;
   a second detector for detecting the number of edges of an image from the image signal generated by said image generator; and
   a controller for performing a focusing control of an imaging lens on the basis of the contrast value and the number of edges detected by said first and second detectors.

2. The autofocusing apparatus according to claim 1, wherein
   when the number of edges detected by said second detector is equal to or larger than a predetermined value, said controller determines that said imaging lens is positioned close to a focus position and, when it is determined that said imaging lens is positioned close to said focus position, said controller drives said imaging lens to a lens position in which the contrast value detected by said first detector indicates its maximum value.

3. The autofocusing apparatus according to claim 2, further comprising:
a calculator for calculating an edge width center of gravity value of an image from the image signal generated by said image generator, wherein
when the number of edges detected by said second detector is equal to or larger than a predetermined value and the edge width center of gravity value calculated by said calculator is within a predetermined range, said controller determines that said imaging lens is positioned close to the focus position.

4. The autofocusing apparatus according to claim 2, wherein
when it is determined that said imaging lens is positioned close to said focus position, said controller drives said imaging lens in the direction that said contrast value detected by said first detector increases.

5. The autofocusing apparatus according to claim 2, wherein
when it is not determined that said imaging lens is positioned close to said focus position, said controller drives said imaging lens at higher speed as compared with the case where it is determined that said imaging lens is positioned close to said focus position.

6. The autofocusing apparatus according to claim 2, wherein
when it is determined that said imaging lens is positioned close to said focus position, said controller drives said imaging lens on the basis of only the contrast value detected by said first detector.

7. A method of autofocusing an imaging lens, comprising the steps of:
generating an image signal;
detecting a contrast value of an image from the image signal generated;
detecting the number of edges of the image from an image signal generated; and
performing a control of focusing said imaging lens on the basis of the detected contrast value and the detected number of edges.

8. The method according to claim 7, further comprising the step of:
determining that said imaging lens is positioned close to a focus position when the detected number of edges is equal to or larger than a predetermined value, wherein
in said step of performing the focusing control, when it is determined that said imaging lens is positioned close to the focus position, said imaging lens is driven to a lens position in which said contrast value indicates its maximum value.

9. The method according to claim 8, further comprising the step of:
calculating an edge width center of gravity value of an image from the image signal generated, wherein
in said step of determining that said imaging lens is positioned close to the focus position, when said number of edges is equal to or larger than a predetermined value and said edge width center of gravity value is within a predetermined range, it is determined that said imaging lens is positioned close to the focus position.

* * * * *